United States Patent [19]

Himmelberger et al.

[11] Patent Number: 4,539,739

[45] Date of Patent: Sep. 10, 1985

[54] APPARATUS FOR MAKING ARMORED ELECTRICAL CABLE

[75] Inventors: John E. Himmelberger, Seymour; James O. Scharf, Oxford, both of Conn.

[73] Assignee: Harvey Hubbell Incorporated, Orange, Conn.

[21] Appl. No.: 566,556

[22] Filed: Dec. 29, 1983

[51] Int. Cl.³ ........................ H01B 13/20; B23P 23/00

[52] U.S. Cl. ........................................ 29/564.1; 29/728; 29/745; 29/868

[58] Field of Search ..................... 29/33 E, 33 F, 33.5, 29/868, 828, 564.1, 825, 728, 745, 755, 564.2, 564; 156/55, 56, 52; 174/103

[56] References Cited

U.S. PATENT DOCUMENTS

| | | | |
|---|---|---|---|
| 2,213,703 | 9/1940 | Henning et al. | 29/728 X |
| 2,899,921 | 8/1959 | Nicolaisen et al. | 29/728 X |
| 3,239,396 | 3/1966 | Boltannon, Jr. | 156/52 |
| 3,523,844 | 8/1970 | Crimmins et al. | 156/52 |
| 3,811,257 | 5/1974 | Burr | 29/868 X |
| 4,009,561 | 3/1977 | Young | 29/728 X |
| 4,113,534 | 9/1978 | Pound et al. | 29/868 X |
| 4,310,365 | 1/1982 | Elliott | 156/55 |
| 4,393,582 | 7/1983 | Arnold | 29/564.1 |
| 4,409,431 | 10/1983 | Neuroth | 174/103 |
| 4,453,036 | 6/1984 | Neuroth | 174/103 |
| 4,454,377 | 6/1984 | Neuroth | 174/103 |
| 4,454,378 | 6/1984 | Neuroth | 174/103 |
| 4,487,641 | 12/1984 | Bohannon, Jr. et al. | 29/745 X |

FOREIGN PATENT DOCUMENTS

| | | | |
|---|---|---|---|
| 2321454 | 10/1974 | Fed. Rep. of Germany | 29/745 |
| 1026318 | 4/1953 | France | 156/55 |
| 1347778 | 2/1974 | United Kingdom | 29/745 |

*Primary Examiner*—William R. Briggs

*Attorney, Agent, or Firm*—Jerry M. Presson; Alfred N. Goodman

[57] ABSTRACT

An apparatus and method for making an armored electrical cable from a plurality of reinforcing struts and a plurality of electrical conductors covered by an armored jacket. The apparatus includes a series of stations along an assembly line that feed, converge, orient, combine, compress and wrap the struts and conductors into the cable configuration. The cross section of the cable so formed is rectangular, although this rectangular shape can be made arcuate by bending.

23 Claims, 14 Drawing Figures

APPARATUS FOR MAKING ARMORED ELECTRICAL CABLE

FIELD OF THE INVENTION

The invention relates to an apparatus and method for making an elongated electrical cable from a plurality of reinforcing struts and a plurality of electrical conductors which are covered by an armored jacket. The cross section of the cable is rectangular, although this rectangular shape can be made arcuate by bending. The apparatus includes a series of stations along an assembly line that feed, converge, orient, combine, and wrap the struts and conductors to form the cable.

BACKGROUND OF THE INVENTION

Electrical cables which are used for supplying electrical energy to, for example, submersible oil well pumps are exposed to significant mechanical stresses and therefore are advantageously covered with an armored jacket. In addition, it is highly advantageous to protect the electrical conductors inside the jacket with a plurality of force-resisting members to specifically resist transverse compression of the cable.

An example of such cable is disclosed in U.S. Pat. No. 4,409,431, the disclosure of which is hereby incorporated by reference and includes three side-by-side conductors with a force-resisting member located between adjacent conductors, thereby forming a flat cable. Another example of such cable is disclosed in prior filed, commonly owned U.S. Pat. No. 4,454,378, the disclosure of which is hereby incorporated by reference and includes a similar structure shown in U.S. Pat. No. 4,409,431 but with an arcuate cross section. A third example of such cable is disclosed in prior filed, commonly owned U.S. Pat. No. 4,454,377, the disclosure of which is hereby incorporated by reference and includes a plurality of force-resisting U-shaped channel members having lead liners therein, these members being located between adjacent conductors.

The structures shown in that patent and applications have been additionally improved upon by providing force-resisting members on the outer edges of the cable to provide the cable with an essentially rectangular cross section.

As is evident, the automatic fabrication of such electrical cables is quite challenging since these cables are typically 8,000 to 10,000 feet long and a plurality of electrical conductors and a plurality of the force-resisting members must be correctly combined and then the armored jacket must be applied around the combination. Complicating this fabrication is the special cross-sectional configuration of each force-resisting member which must be specifically oriented and aligned relative to the conductors and the other force-resisting members. While construction of armored electrical cable has been known in the past, the apparatus and methods which are conventionally practiced deal mainly with a single conductor or a cable having a circular or oval cross section, which are fairly simple to construct and whose parts do not require specific orientation and alignment.

Accordingly, there is a specific need to provide an improved apparatus and method for making armored electrical cable that is constructed of a plurality of conductors and force-resisting members with a rectangular cross section.

SUMMARY

Accordingly, a primary object of the invention is to provide an apparatus and method for making armored electrical cable that provides automatic and continuous fabrication.

Another object of the invention is to provide such an apparatus and method which is economical and reasonably simple to construct and operate.

Another object of the invention is to provide such an apparatus and method that can orient and align a plurality of parts forming the cable, and can produce a cable having a rectangular cross section.

The foregoing objects are basically attained by providing an apparatus for making an armored electrical cable from a plurality of electrical conductors and a plurality of reinforcing struts, the combination comprising a plurality of reels, each carrying a strut thereon; a conveyor for conveying the struts from the reels in a feeding direction; a second plurality of reels, each carrying a conductor thereon; a positioning assembly, located downstream of the conveyor, for receiving the struts from the conveyor and the conductors from the second plurality of reels, and for converging the struts and the conductors; a guide assembly, located downstream of the positioning assembly, for receiving the converged struts and conductors from the positioning assembly and for combining the struts and conductors; an armor applying machine, located downstream of the guide assembly, for applying a tape of armor over the combined struts and conductors to complete the armored cable; a pulling assembly, located downstream of the armor applying machine, for pulling the armored cable in the feeding direction; and a take-up reel, located downstream of the pulling assembly, for receiving the armored cable from the pulling assembly.

Advantageously, the positioning assembly orients the plurality of electrical conductors and the plurality of reinforcing struts so that they can be combined in the guide assembly in a side-by-side relationship approximating the final rectangular cross section of the cable.

The foregoing objects are also basically attained by providing a method of making an armored electrical cable from at least one electrical conductor and at least two reinforcing struts, comprising the steps of feeding the two struts in a feeding direction, feeding the conductor in the same feeding direction, converging the struts and the conductor, combining the struts and the conductor into a predetermined array, covering the array of struts and conductor with an armored jacket to complete the armored cable, and rolling the armored cable onto a reel.

Advantageously, the converging step includes orienting the struts in a predetermined orientation around their longitudinal axes relative to the conductor and aligning the struts and conductor into a side-by-side relationship.

Other objects, advantages, and salient features of the present invention will become apparent from the following detailed description, which, taken in conjunction with the annexed drawings, discloses a preferred embodiment of the invention.

DRAWINGS

Referring now to the drawings which form a part of this original disclosure:

DETAILED DESCRIPTION OF THE INVENTION

Figure 1:
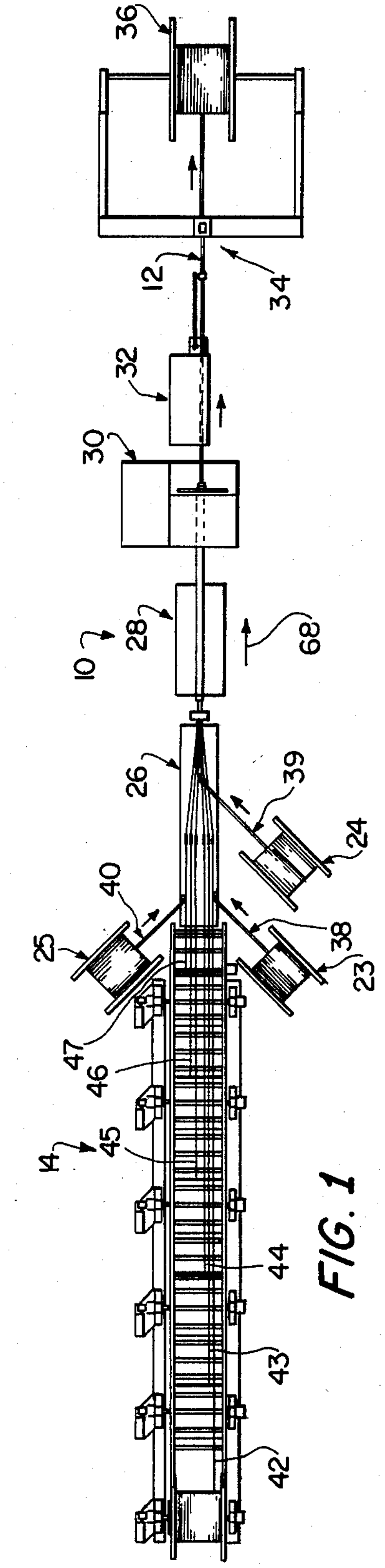
FIG. 1 is a top plan diagrammatic view of the apparatus in accordance with the present invention for making the armored electrical cable including a roller conveyor, a positioning table, a guide assembly, an armor applying machine, a pulling assembly, a bending assembly and a take-up reel.

Referring first to FIGS. 1 and 5–10, the overall apparatus 10 in accordance with the invention for making the armored electrical cable 12 comprises a roller conveyor 14, a plurality of reels 16–21 located below the conveyor (FIGS. 5 and 6), a second plurality of reels 23–25 located adjacent the conveyor, a positioning table 26, a guide assembly 28, an armor applying machine 30, a pulling assembly 32, a bending assembly 34, and a take-up reel 36. All of these components are aligned in sequence along an assembly line, each forming a specific station for fabricating and moving the cable 12 in a feeding direction along the assembly line.

Figure 3:
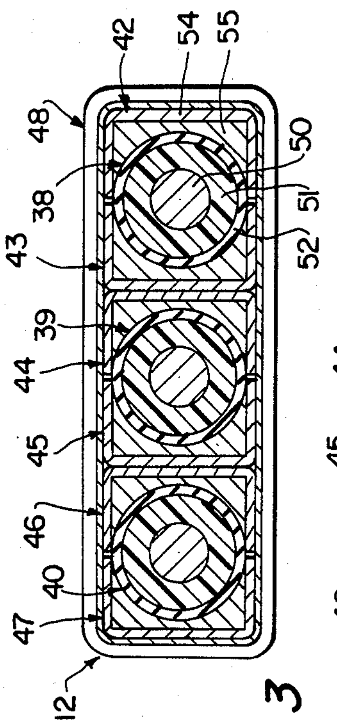
FIG. 3 is an enlarged, side elevational view in section taken along line 3—3 in FIG. 2 showing the component parts of the cable in the rectangular cross sectional configuration.
Figure 4:
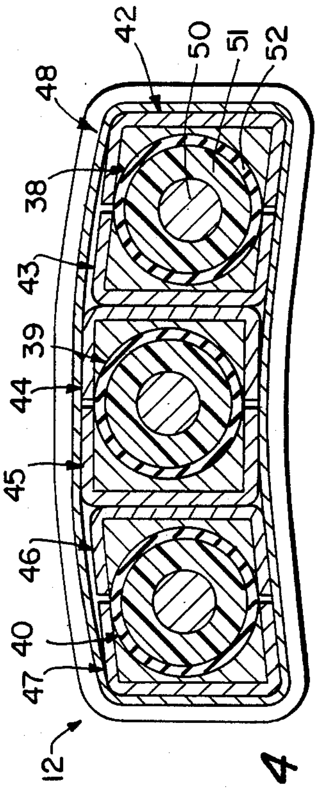
FIG. 4 is an enlarged, side elevational view similar to that shown in FIG. 3 except that the cross section of the cable has been rendered arcuate.
Figure 2:
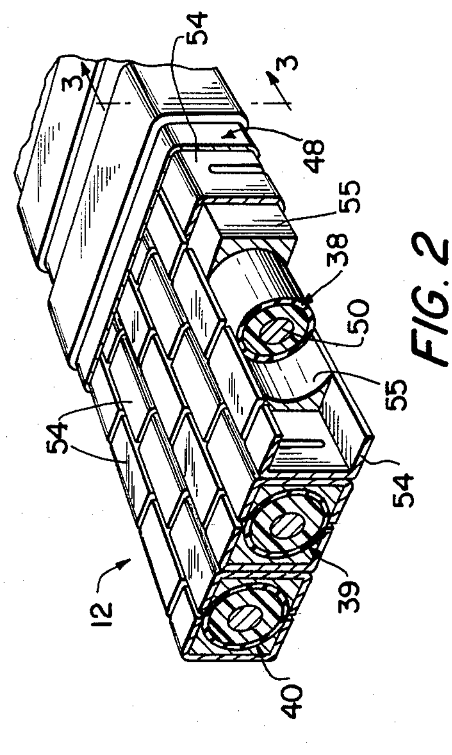
FIG. 2 is a right perspective view in partial section of the rectangular armored electrical cable to be formed by the apparatus shown in FIG. 1.

As seen in FIGS. 2–4, the cable 12 is formed from three electrical conductors 38–40, six struts 42–47, and a helically wrapped metallic protective jacket or armor tape 48. Each of the electrical conductors has a pair of struts on opposite sides, the struts and electrical conductors are aligned in a side-by-side relationship and the armor tape is wrapped around the combined conductors and struts.

Thus in general terms, the roller conveyor 14 is intended to convey the six struts in the feeding direction, the positioning table 26 converges the electrical conductors and struts together and orients them into a flat side-by-side relationship, the guide assembly 28 combines these conductors and struts into an array with a rectangular cross section, the armor applying machine 30 then applies the armor tape, the pulling assembly 32 pulls the cable in the feeding direction, the bending assembly 34 converts the rectangular cross section shown in FIG. 3 to the arcuate configuration shown in FIG. 4, and finally the take-up reel 36 helically wraps the completed cable for storage and transport.

A. The Electrical Cable

As seen best in FIGS. 2–4 and 12, the electrical cable 12 to be produced by the apparatus 10 in accordance with the invention includes the three electrical conductors 38–40, the six struts 42–47 and the armor tape 48.

The armor tape 48 is conventional, is advantageously formed from metal with a Z-cross section and is applied by the conventional armor applying machine 30 in a helical overlapping manner so that it interlocks with each adjacent helical wrap.

Figures 12, 13, 14:
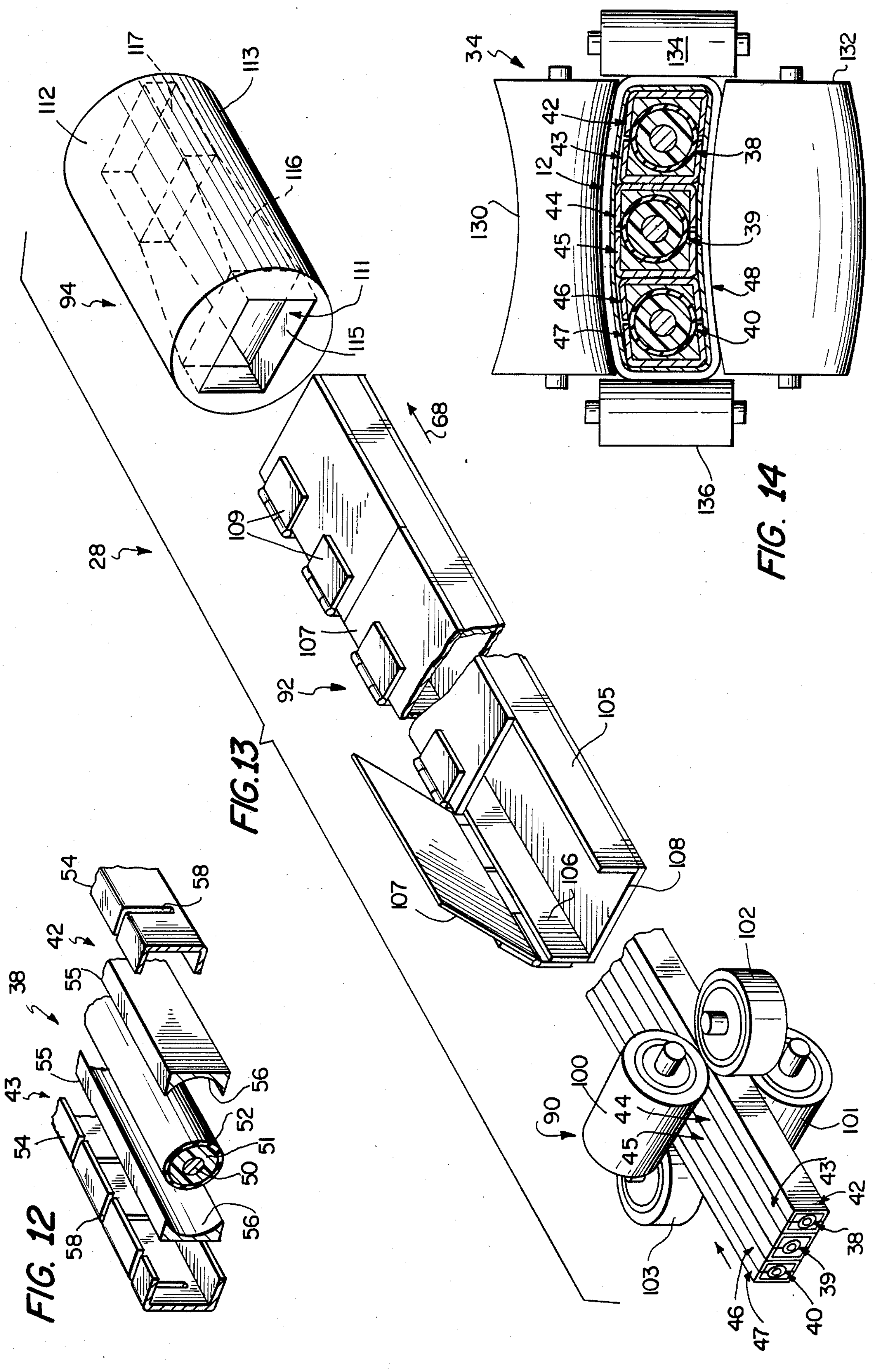
FIG. 12 is an exploded right perspective view of a single electrical conductor with a pair of liners and force-resisting channel members on opposed sides, these liners and members each forming a single strut.
FIG. 13 is a further enlarged, right perspective view of the guide assembly.
FIG. 14 is a further enlarged left side elevational view in section taken along line 14—14 in FIG. 9 of the bending assembly used to bend the rectangular cable into an arcuate cross section.

As seen in FIG. 12 with conductor 38 being illustrated by way of example, each of the three electrical conductors is the same and basically includes a conducting wire 50 or a plurality of wires surrounded by an insulating cylindrical layer 51 which is in turn surrounded by a chemical barrier insulating cylindrical layer 52.

As seen in FIG. 12, each of the struts is formed from a force-resisting U-shaped channel member 54 and a lead liner 55 received in the U-shaped channel defined by the member. The side of each of the lead liners 55 facing the cylindrical conductor has a semi-cylindrical recess 56 so that once a pair of struts are placed against opposed sides of a conductor, as seen in FIGS. 2–4, a substantially rectangular subassembly is formed by the electrical conductor and the pair of struts.

As seen in FIGS. 2 and 12, a plurality of slots 58 are formed in each of the channel members to increase their long radius bending capability.

As seen in FIGS. 2–4, the three sets of conductors and struts are combined into a side-by-side relationship and covered by the armor tape 48 to form the completed cable.

B. Roller Conveyor

Figure 5:
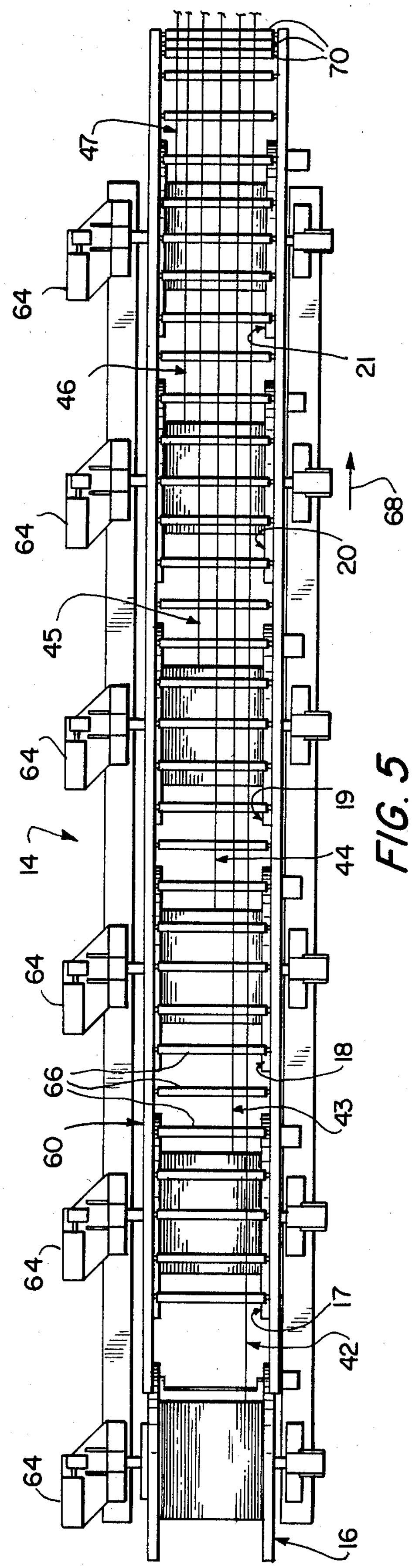
FIG. 5 is an enlarged, top plan view of the roller conveyor shown in FIG. 1 with a plurality of reels of struts being located beneath the conveyor.
Figure 6:
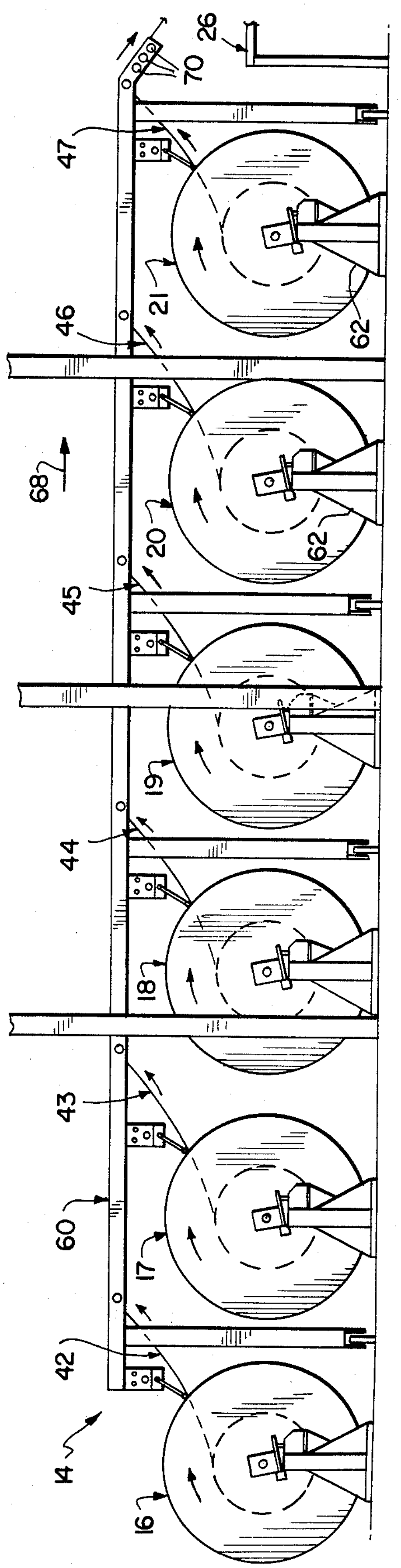
FIG. 6 is a side elevational view of the roller conveyor and reels shown in FIG. 5.

Referring now to FIGS. 5 and 6, the roller conveyor 14 is shown mounted on a horizontal frame 60 with the six reels 16–21 for the struts located beneath the conveyor. Each of these reels is supported by a stand 62 for rotation, which rotation is powered by six motors 64, seen in FIG. 5.

The series of rollers 66 in the roller conveyor 14 are suitably rotatably coupled to the frame 60 and form a horizontal surface for conveying the struts 42–47 from each of the reels 16–21 in the feeding direction indicated by arrow 68 in FIGS. 5 and 6.

As seen in FIG. 6, each of the struts extends from the reel upwardly through various spaces between the rollers 66 and then longitudinally of the roller conveyor over a final set of rollers 70 at the delivery end of the roller conveyor. From the roller conveyor, the struts are fed onto the positioning table 26.

C. Positioning Table

Figure 7:
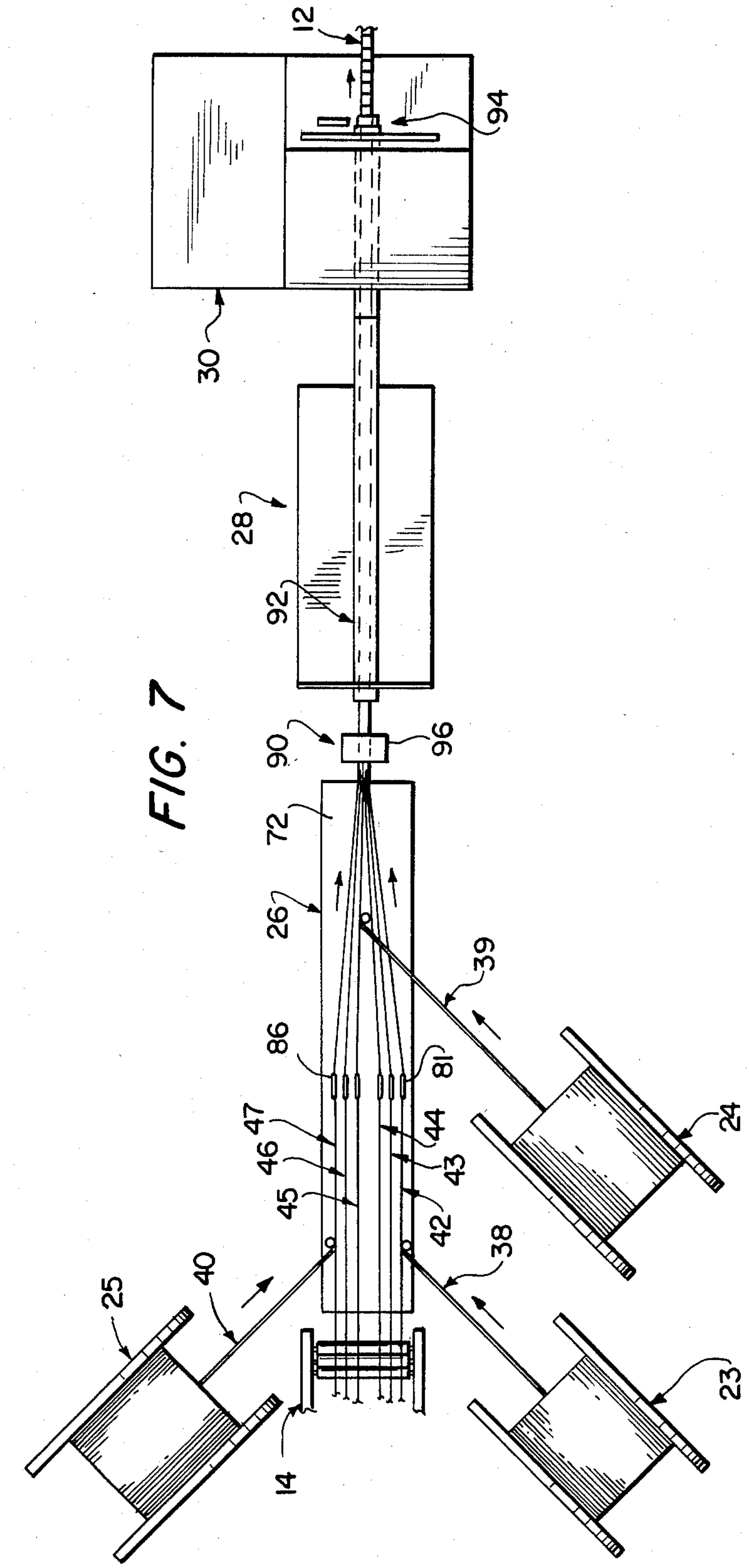
FIG. 7 is an enlarged top plan view of the conductor reels, positioning table, guide assembly and armor applying machine shown in FIG. 1.
Figure 8:
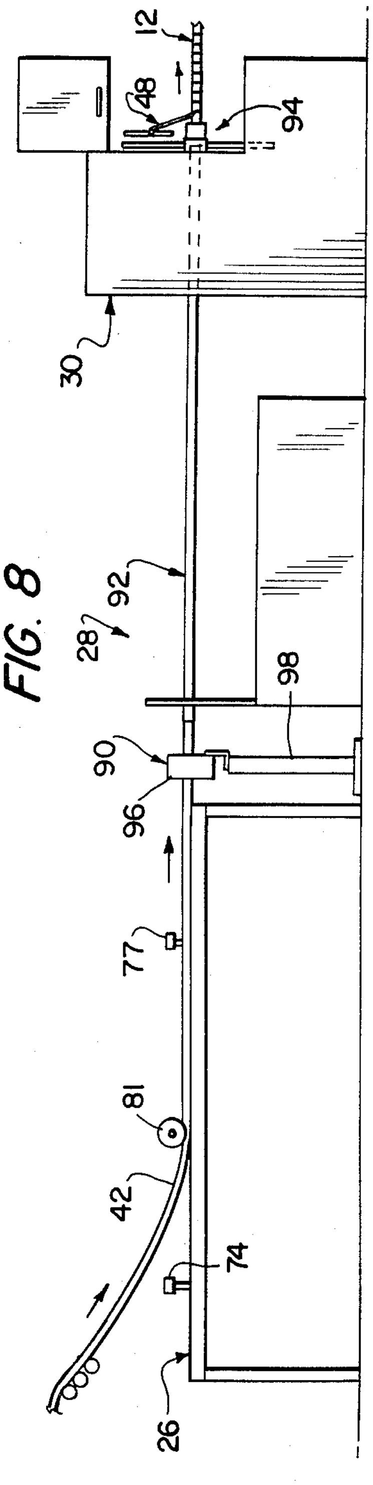
FIG. 8 is a side elevational view showing the positioning table, guide assembly and armor applying machine shown in FIG. 7.
Figure 11:
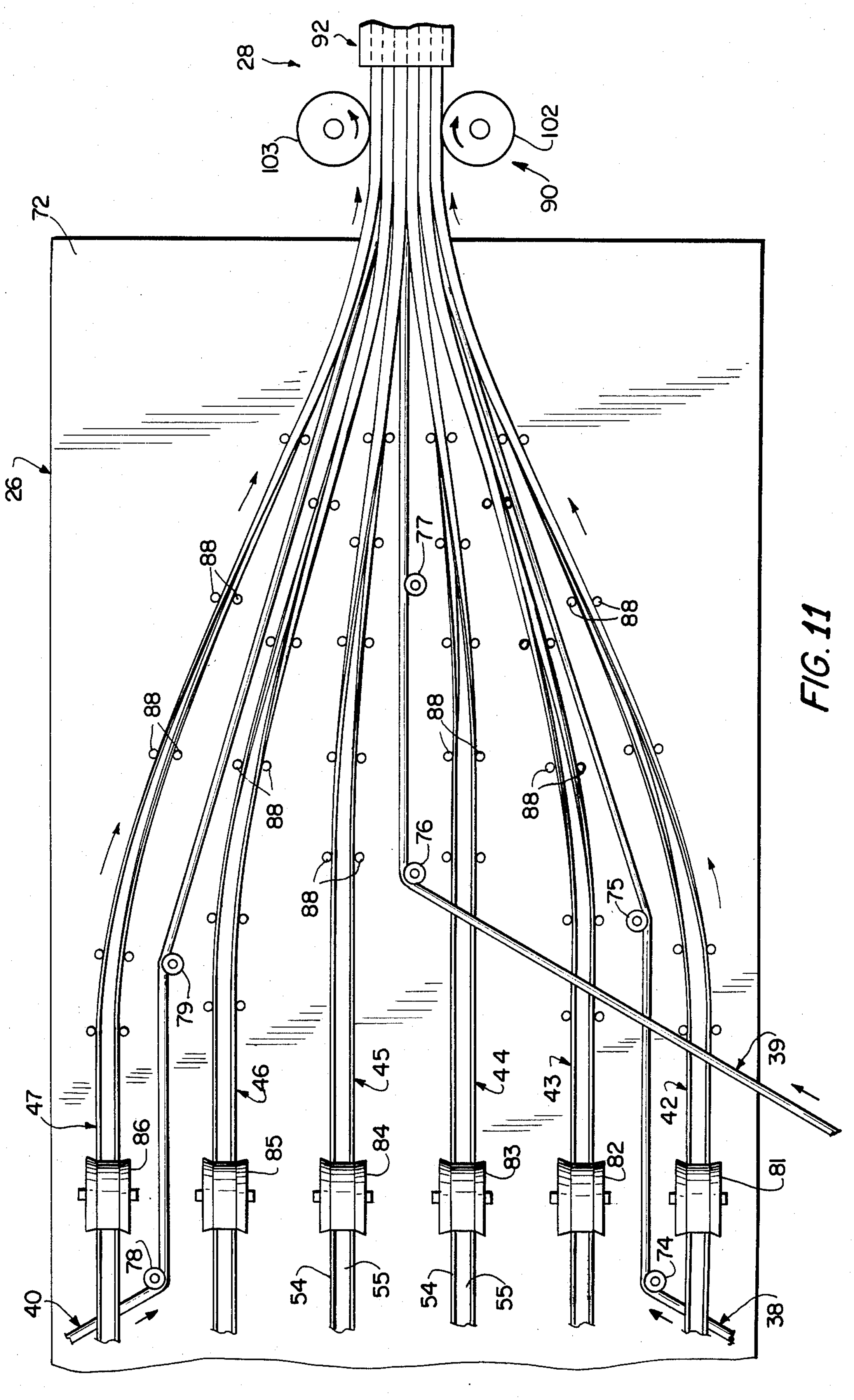
FIG. 11 is a further enlarged top plan view of the positioning table and a portion of the guide assembly downstream thereof for converging the electrical conductors and reinforcing struts and orienting them relative to one another.

Referring now to FIGS. 7, 8 and 11, the positioning table 26 is located downstream from and below the roller conveyor 14 and includes a horizontal flat surface 72 for converging, orienting and aligning the struts 42–47 and the electrical conductors 38–40 into a side-by-side relationship.

As seen in FIG. 7, the three conductor reels 23–25 are located adjacent opposite sides of the positioning table and conveyor and feed the conductors wrapped thereon towards the positioning table, these reels being suitably supported for rotation.

As seen in FIG. 11, suitably supported on top of the table with vertically oriented axes are a series of grooved rollers 74 and 75 for directing conductor 38 transversely and longitudinally of the positioning table, rollers 76 and 77 for doing this with conductor 39, and rollers 78 and 79 for doing this with conductor 40. Conductor 39 moves transversely of the table above the struts, while conductors 38 and 40 move transversely below the struts.

Coaxially supported on the table with horizontal axes are six additional grooved rollers 81–86, each respectively receiving a strut 42–47 therebelow to guide the struts longitudinally of the table from the roller conveyor. As illustrated best in FIG. 11, each of the struts is fed from the roller conveyor with the lead liner 55 facing upwardly and thus with the U-shaped channel member 54 also facing upwardly. As best seen in FIG. 8, advantageously rollers 81–86 are located above the top of the horizontal surface 72 a sufficient height to receive the struts therebelow with the srtuts sliding across the table. These rollers can advantageously be spring-biased downwardly.

As seen in FIG. 11, a plurality of vertically extending rods 88 are rigidly coupled to the table to converge the struts towards the center of the table and also pivot or twist the struts through 90° along their longitudinal axes so that the lead liners 55 face one another in pairs and enclose an electrical conductor therebetween. As seen in FIG. 11, there are six sets of rods 88, one set for each strut, and each set includes ten rods positioned in five pairs on opposed sides of each strut. As the pairs of struts are located closer to the right hand end of the table 26, they are located closer together so that they can twist the strut through the 90° required to change each strut from a "liner-up" position to a "liner-sideways" position. In this regard, struts 42 and 43 are twisted towards each other to enclose conductor 38, as are struts 44 and 45 regarding conductor 39 and struts 46 and 47 regarding conductor 40.

D. Guide Assembly

As illustrated in FIGS. 7, 8, 11 and 13, the guide assembly 28 is located downstream from the delivery end of the positioning table and functions to combine the converged struts and conductors into a predetermined, rectangular array as best seen in FIGS. 11 and 13. The guide assembly 28 comprises a first guide unit 90, a second guide unit 92, and a third guide unit 94.

The first guide unit 90 comprises a housing 96 supported on a stand 98 as seen in FIG. 8 for enclosing and suitably rotatably supporting four rollers 100–103, as seen in FIG. 13. Rollers 100 and 101 are horizontally oriented and are supported respectively above and below the strut and conductor array exiting from the positioning table. Rollers 102 and 103 are vertically oriented on opposite sides of the array, these four rollers defining a rectangular opening therebetween to combine the struts and conductors into the rectangular array. Advantageously, the top of roller 101 and surface 72 on the table are coplanar.

The second guide unit 92, as best seen in FIG. 13, comprises an elongated tube having a through passageway of rectangular cross section formed by a pair of opposed sidewalls 105 and 106 and a pair of opposed top and bottom walls 107 and 108. A plurality of hinges 109 hingeably couple the top wall 107, which can be formed in sections, to the sidewall 106, this top wall being clamped, via for example C-clamps, in the closed position to contain the rectangular array of struts and conductors therein. The cross sectional area of the passageway in this second guide unit is substantially the same as the rectangular opening formed by the rollers in first guide unit. By providing the elongated tube of the second guide unit slight relative longitudinal movement of the struts and conductors can take place without destroying the combined rectangular array. The top of bottom wall 108 is advantageously coplanar with the top of roller 101.

The third guide unit 94, best seen in FIG. 13, comprises a compressing die with an open-ended cavity 111 formed therethrough, this die being formed by a top element 112 and a bottom element 113 which can be rigidly coupled together by any suitable means. The cavity 111 formed in this die has a rectangular cross section throughout and includes a first portion 115, a second portion 116 and a third portion 117. The first portion 115 has a constant rectangular cross section which is substantially equal to the cross section of the passageway defined in the second guide unit. The third portion 117 also has a constant rectangular cross section; however, the area of this cross section is somewhat smaller than the area of the first portion. Interconnecting the first and third portions, the second portion 116 has a tapering cross section in which the rectangular array of struts and conductors is compressed into a tightly fitting relationship and into its final rectangular configuration as it passes therethrough and into the third portion 117.

E. Armor Applying Machine

As seen in FIGS. 7–10, the armor applying machine 30 is a conventional device for helically wrapping the rectangular array of struts and conductors exiting from the third guide unit 94. The armor tape 48, as seen in FIG. 8, is applied downstream of the third guide unit so that when the armor is applied the rectangular array of struts and conductors is in its final rectangular configuration.

F. Pulling Assembly

Figure 9:
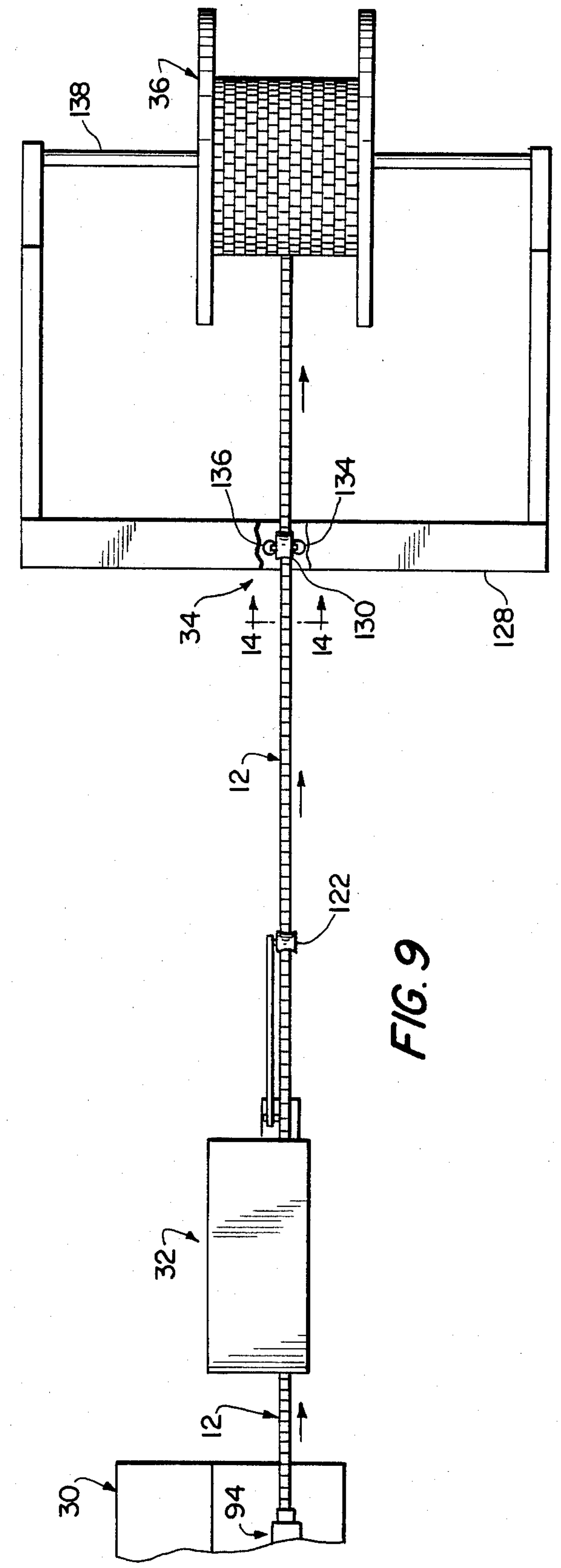
FIG. 9 is an enlarged, top plan view of the armor applying machine, pulling assembly, bending assembly and take-up reel shown in FIG. 1.
Figure 10:
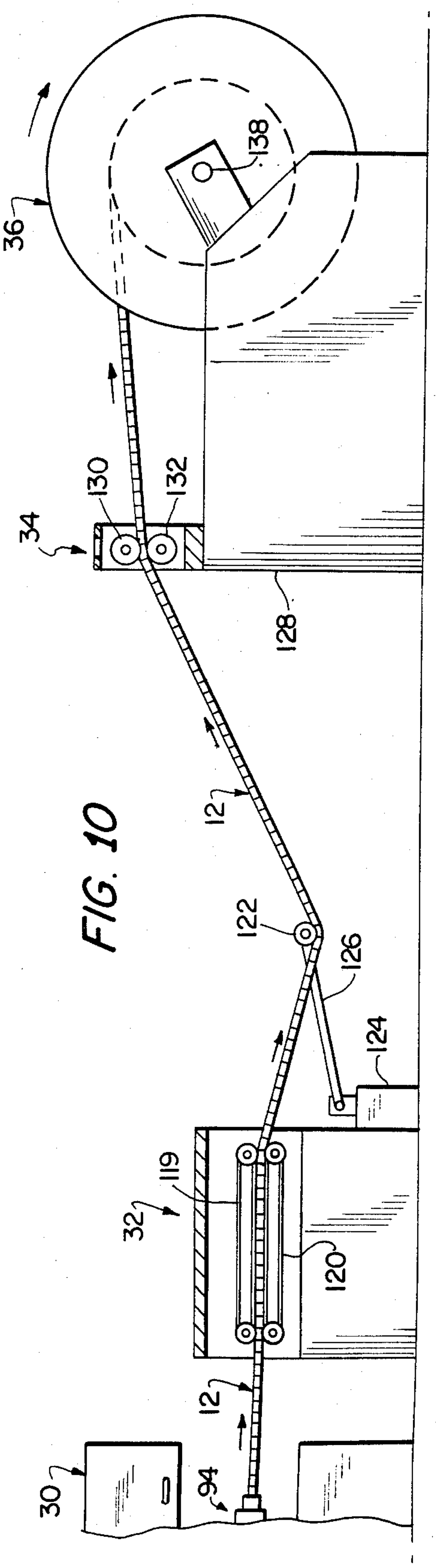
FIG. 10 is a side elevational view of the armor applying machine, pulling assembly, bending assembly and take-up reel shown in FIG. 9.

As seen in FIGS. 9 and 10, the pulling assembly 32 is downstream from the armor applying machine and basically comprises a pair of powered, opposed endless belts 119 and 120 for pulling the cable 12, and thus the struts and conductors, in the feeding direction towards the take-up reel 36. Downstream of the pulling assembly is a guide roller 122 coupled to a support 124 via an arm 126 for guiding the cable 12 from the pulling assembly.

G. Bending Assembly

As seen in FIGS. 9, 10 and 14, the bending assembly 34 is located downstream from the pulling assembly and is supported on a frame 128.

As seen in FIG. 14, the bending assembly is intended to change the rectangular cross section of the cable 12 to an arcuate one, if desired, by utilizing four rollers. This includes a top roller 130, a bottom roller 132 and a pair of side rollers 134 and 136. These rollers are suitably supported for rotation on the frame 128, with the side rollers 134 and 136 having vertical axes and being spaced apart the width of the arcuate cable 12, and with rollers 130 and 132 having horizontal axes and spaced apart the thickness of the arcuate cable. The top roller 130 has a concave surface while the bottom roller 132 has a convex outer surface. Thus, these four rollers define an arcuate cavity therebetween which in turn defines the arcuate cross section of the cable 12.

H. Take-Up Reel

As seen in FIGS. 9 and 10, the take-up reel 36 is suitably supported for rotation via horizontal shaft 138 on frame 128 and is located downstream from the bending assembly 34 for storing the fabricated cable.

Operation

Referring now to FIGS. 1 and 5–14, the operation of the apparatus 10 in accordance with the invention comprises first feeding the plurality of struts 42–47 from their reels 16–21 along the roller conveyor 14 via motors 64 in the feeding direction 68.

Simultaneously, the three conductors 38–40 are fed from their reels 23–25 towards the positioning table 26 and then longitudinally therealong in the feeding direction, as the struts exiting from the roller conveyor also move longitudinally of the positioning table.

During this longitudinal movement, the struts are twisted about their longitudinal axes through 90° and converged with the conductors towards the center of the table so that each pair of struts receives a conductor therebetween, as seen best in FIG. 11. Moreover, the conductors and struts are converged into a side-by-side relationship as the struts slide along the table.

Then, as the three sets of struts and conductors exit the positioning table 26, they are combined into the predetermined rectangular array via the four rollers 100–103 in the first guide unit 90. The struts and conductors then continue through the tube defined by the second guide unit 92 and pass through the third guide unit 94 where this rectangular array is compressed into the desired rectangular cross-sectional area.

Upon exiting from the third guide unit 94, the armor tape 48 is applied helically as seen in FIG. 8, and then the now complete, armored cable 12 enters the pulling assembly 32.

The pulling assembly further pulls the cable in the feeding direction 68 and if desired the cable enters the bending assembly 34 so that it is bent from the rectangular cross section into the arcuate cross section shown in FIG. 14.

Finally, the cable 12 is wrapped on the take-up reel 36.

Thus, once the cable 12 is passed through each of the various stations in the assembly line shown in FIG. 1, significant lengths of the cable can be automatically and continuously fabricated in the desired array and cross section.

Advantageously, before the apparatus is activated, the struts and conductors are hand-fed through the positioning table and guide assembly so that the proper orientation of these parts is assured during operation of the apparatus. Moreover, a length of rope or cord can be connected to the ends of the conductors and struts downstream of the guide assembly and run through the pulling assembly to commence the cable's fabrication. Alternately, the struts and conductors can be extended through the pulling assembly downstream of the armor applying machine and these sections of the struts and conductors, which would not be wrapped by the armor tape, can be discarded.

While one advantageous embodiment has been chosen to illustrate the invention, it will be understood by those skilled in the art that various changes and modifications can be made therein without departing from the scope of the invention as defined in the appended claims.

What is claimed is:

1. An apparatus for making an armored electrical cable from a plurality of electrical conductors and a plurality of reinforcing struts, the combination comprising:

a plurality of reels, each carrying a strut thereon;

conveyor means for conveying the struts from said reels in a feeding direction;

a second plurality of reels, each carrying a conductor thereon;

positioning means, located downstream of said conveyor means, for receiving the struts from said conveyor means and the conductors from said second plurality of reels, and for converging the struts and the conductors;

guide means, located downstream of said positioning means, for receiving the converged struts and conductors from said positioning means and for combining the struts and the conductors;

armor means, located downstream of said guide means, for applying a tape of armor over the combined struts and conductors to complete the armored cable;

pulling means, located downstream of said armor means, for pulling the armored cable in the feeding direction; and a take-up reel, located downstream of said pulling means, for receiving the armored cable from said pulling means.

2. An apparatus according to claim 1, and further comprising means, coupled to said plurality of reels, for rotating said reels to feed the struts in the feeding direction.

3. An apparatus according to claim 1, wherein said plurality of reels are located below said conveyor means.

4. An apparatus according to claim 1, wherein said conveyor means is a roller conveyor.

5. An apparatus according to claim 1, wherein said second plurality of reels are located adjacent said positioning means.

6. An apparatus according to claim 1, wherein said positioning means comprises a horizontal surface.

7. An apparatus according to claim 1, wherein said positioning means comprises a plurality of rollers having horizontal axes for receiving the struts, and a second plurality of rollers having vertical axes for receiving the conductors.

8. An apparatus according to claim 7, wherein said positioning means further comprises means for pivoting the struts around their longitudinal axes.

9. An apparatus according to claim 8, wherein said means for pivoting pivots the struts through 90°.

10. An apparatus according to claim 8, wherein said means for pivoting comprises a plurality of sets of vertical rods, each set pivoting one of the struts.

11. An apparatus according to claim 1, wherein said positioning means comprises means for pivoting the struts around their longitudinal axes.

12. An apparatus according to claim 1, wherein said guide means comprises a first guide unit including a plurality of rollers, a second guide unit including an elongated tube and located downstream of said first guide unit, and a third guide unit including an open-ended cavity having a portion with a tapering cross section and located downstream of said second guide unit.

13. An apparatus according to claim 12, wherein said rollers in said first guide unit define an opening therebetween having a rectangular shape.

14. An apparatus according to claim 12, wherein said second guide unit tube defines a passageway therein having a rectangular cross section.

15. An apparatus according to claim 12, wherein said third guide unit open-ended cavity has a rectangular cross section.

16. An apparatus according to claim 1, wherein said positioning means converges the struts and conductors into a side-by-side relationship with each conductor having a pair of struts located on opposed sides.

17. An apparatus according to claim 1, wherein said pulling means comprises a pair of opposed, powered endless members.

18. An apparatus according to claim 1, and further comprising means, located between said pulling means and said take-up reel, for bending the armored cable around the longitudinal axis thereof.

19. An apparatus according to claim 18, wherein said means for bending comprises a pair of opposed rollers, one of said rollers having a concave outer surface and the other of said rollers having a convex outer surface.

20. An apparatus for making an armored electrical cable from a supply of at least one elongated electrical conductor and a supply of at least two elongated reinforcing struts, the combination comprising:

conveyor means for conveying the struts from the supply thereof in a feeding direction;

positioning means, located downstream of said conveyor means, for receiving the struts from said conveyor means and the conductor from the supply thereof, and for converging the struts and the conductor;

guide means, located downstream of said positioning means, for receiving the converged struts and conductor from said positioning means and for combining the struts and the conductor;

armor means, located downstream of said guide means, for applying an armored jacket over the combined struts and conductor to complete the armored cable;

pulling means, located downstream of said armor means, for pulling the armored cable in the feeding direction; and storage means, located downstream of said pulling means, for receiving the armored cable from said pulling means.

21. An apparatus according to claim 20, wherein said positioning means includes means for aligning the struts and the conductor into a side-by-side relationship.

22. An apparatus according to claim 20, wherein said positioning means includes means for orienting the struts in a predetermined orientation around their longitudinal axes relative to the conductor.

23. An apparatus according to claim 20, wherein said guide means includes means for compressing the struts and the conductor into a tightly fitting relationship.

* * * * *